2,903,380
PROCESS FOR PRODUCING COMPOSITE STRUCTURES COMPRISING RIGID POLYURETHANE FOAMS AND COVERING LAYERS

Peter Hoppe, Troisdorf, and Hans-Willi Paffrath, Koln-Deutz, Germany, assignors, by direct and mesne assignments of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application February 3, 1955
Serial No. 486,034
Claims priority, application Germany February 5, 1954
2 Claims. (Cl. 117—75)

This invention relates to composite structures comprising rigid polyurethane foams and covering layers.

It is known in the art that it is generally necessary when filling hollow metal, plastic or wooden articles to employ a foaming polyurethane forming composition which will set up high internal pressure so as to improve the bonding action of the resulting plastic foam. However, in the production of sandwich type structures it is not possible to rely upon the supplemental action of the above mentioned internal pressure and, therefore, it is essential that the bonding of the plastic foam to the covering layer be greater than the tensile strength of the plastic foam in order to avoid separation of the covering layer due to buckling or bending of the composite structure. Moreover, it is essential in the production of sandwich type structures, i.e. combinations of light materials, especially foamed plastics, with high strength covering layers of metal, plastics or plywood, that the plastic foam be satisfactorily bonded to the covering layer in order to produce the required supporting effect.

It is therefore an object of the present invention to provide composite structures comprising polyurethane foams and high strength covering layers and a process for producing same.

Another object of the invention is to provide a process for producing composite structures comprising polyurethane foams and high strength covering layers in which the strength of bond between the elements of said composite structures is substantially improved over that of bonds of the prior art.

A further object of the invention is to provide a process for producing composite structures comprising polyurethane foams and high strength covering layers in which the bond between the elements of said composite structures is greater than the tensile strength of the foams.

A still further object of the invention is to provide a process for producing composite structures comprising polyurethane foams and high strength covering layers in which the bond between the elements of said structures is of such strength that the covering layer will not separate from the foams on buckling or bending of said composite structures.

Other objects and advantages will appear hereinafter as the description of the invention unfolds.

In accordance with this invention it has been discovered that, in addition to the conventional steps of priming covering layers such as metal sheets, plastics, and plywood, etc. or roughening such covering layers by rubbing with emery or by sanding-blasting, it is highly advantageous to provide these covering layers with a preliminary coating of a potentially reactive polyesterisocyanate mixture so that during the foaming operation the subsequently applied plastic foam will anchor itself intimately to the preliminary coating which in turn is firmly bonded to the covering layers. Accordingly, the present invention is directed to a process for substantially improving the strength of the bond between rigid polyurethane foams and covering layers of all types such as metal, wood and plastics, etc., which comprises initially coating the covering layers with a potentially reactive mixture of a polyester and an isocyanate (with or without pretreatment by the above conventional steps), applying a rigid plastic foam-forming composition thereto and then carrying out the foaming operation. This process of bonding is quite essential in the case of very thin covering layers, particularly those composed of light metal or steel having a wall thickness of from 0.1–0.4 mm. since sandblasting or treatment thereof with emery would produce serious deformation of these covering layers. In any event it is necessary that such covering layers be degreased before they are coated by the above described process.

The preliminary coating applied to the covering layer in accordance with the invention may be prepared from branched polyesters derived from adipic acid, 1,3-butanediol and hexanetriol, and aromatic diisocyanates, such as toluylene diisocyanate. Alternatively, isocyanate-modified polyesters which are prepared from linear polyesters derived from adipic acid and diethylene glycol, and aliphatic diisocyanates, such as hexamethylene diisocyanate, may be used in the formation of the initial coating. These isocyanate modified polyesters are preferably used in a solution containing a small amount of a tertiary amine as activator. They form a highly elastic coating which bonds excellently to the covering layers and produces a rigid union of the rigid plastic foam with the covering layer. Moreover, the use of such modified polyesters has the advantage that the foaming can take place before complete hardening.

For the production of the preliminary coatings, highly satisfactory results can also be obtained by the use of combinations prepared from linear polyesters, for example those based on adipic acid and glycol, and polyisocyanates such as triphenyl methane triisocyanate and the triisocyanate derived from 1 mol of hexanetriol and 3 mols of toluylene diisocyanate. The use of such combinations for the preliminary coatings of covering layers in composite structures is desirable because these coatings remain permanently elastic.

If it is desirable to improve the bonding power of rigid polyurethane foams to covering layers consisting of aluminum alloys, zinc chromate is added to the mixture of polyester and isocyanate.

The following examples further illustrate the invention in which parts and percentages are by weight.

Example 1

Preliminary coating prepared from a polyester and a polyisocyanate.

100 parts of a polyester prepared from 3 mols of adipic acid, 2 mols of 1,3-butylene glycol and 2 mols of hexanetriol (acid number=2–3; 7–8 OH percent) are combined with 36 parts of toluylene diisocyanate and carefully mixed. The resulting mixture is applied as a preliminary coating with a brush to a degreased metallic covering layer which, if necessary, is roughened by treating it with emery.

The foaming process is carried out either immediately or after the pretreated covering layers have stood for some time. This process is executed by mixing together (a) a polyester mixture consisting of 80 parts of a polyester prepared from 2 mols of adipic acid, 0.4 mol of phthalic anhydride, 2.4 mols of trimethylol propane and 0.8 part of 1,3-butylene glycol + 20 parts of a polyester prepared from 1.43 mol of adipic acid, 1 mol of hexanetriol and 1 mol of 1,3-butylene glycol; (b) 10 parts of powdered silicic acid; (c) an activator mixture consisting of 3 parts of an esterification product of 1 mol of adipic acid and 2 mols of N-diethyl ethanolamine, 2 parts of diethylamine oleate, and 4 parts of sulfonated castor oil containing 54% of water; and (d) 67 parts of toluylene diisocyanate; applying the resulting composition of the precoated covering layer and allowing the foaming operation to take place.

*Example 2*

Preliminary coating prepared from a polyester and a polyisocyanate which contains a filler for improving the bonding of the coating to metallic covering layers.

100 parts of the polyester described in Example 1 are carefully mixed with 10 parts of zinc chromate and 36 parts of toluylene diisocyanates and the resulting composition similarly applied as a lacquer with a brush to the inside of covering layers or to hollow constructions formed from such layers. The foaming process (for details see Example 1) is carried out immediately or after the covering layers precoated in this manner have stood for a relatively long period.

*Example 3*

A benzene solution containing 80% of the addition product prepared from 100 parts of a linear polyester derived from adipic acid and diethylene glycol (hydroxyl number: 45) and 13 parts of hexamethylene diisocyanate, and 2.5% of a mixture of peralkylated diethylene triamine and peralkylated triethylene tetramine, is brushed or sprayed on to carefully degreased metallic covering layers or degreased plastic covering layers. The foaming process (for details see Example 1) is carried out either immediately or after the pretreated covering layers have stood for a relatively long time.

*Example 4*

100 parts of a linear polyester based on adipic acid and glycol are mixed with either 5 parts of toluylene diisocyanate or the triisocyanate derived from 1 mol of hexanetriol and 3 mols of toluylene diisocyanate, and the resulting product is applied as a preliminary coating to a covering layer of aluminum. It is possible to increase the amount of isocyanate to 10 parts in order to increase the viscosity of the preliminary coating. The foaming process (for details see Example 1) is carried out either immediately or after the pretreated covering layers have stood for a relatively long time.

In all of the above examples, the strength of the bond between the plastic foam and the covering layer exceeds the tensile strength of the plastic foam per se. Thus, the plastic foam will tear before the covering layer is separated when a composite structure made in accordance with the invention is subjected to a vertical tension.

The rigid polyurethane foam used in the production of the composite structures of the invention is prepared by conventional methods, i.e. from branched polyesters containing free hydroxyl and/or carboxyl groups and polyisocyanates in the presence or absence of water. Said branched polyesters are ordinarily obtained from dicarboxylic acids, such as adipic acid and phthalic anhydride, and trihydric alcohols, such as trimethylol propane and hexanetriol, or from dicarboxylic acids and mixtures consisting of di- and trihydric alcohols, suitable dihydric alcohols being ethylene glycol and 1,3-butanediol. In the production of rigid polyurethane foam, these polyesters are reacted with a polyisocyanate, such as toluylene diisocyanate. When using 100 parts of a polyester having a hydroxyl number within the range of 150–400, the amount of toluylene diisocyanate to be employed in the foaming process will range from about 10–90 parts, depending upon the hydroxyl number of the polyester. In addition to the toluylene diisocyanate, about 1–3 parts of water, 2–4 parts of a tertiary amine as an accelerator, and 1–10 parts of an emulsifier will be mixed with the above quantities of polyester and toluylene diisocyanate.

What is claimed is:

1. A method for bonding a polyurethane foam to aluminum comprising coating the aluminum with a liquid mixture comprising a polyester, a polyisocyanate and zinc chromate, said mixture being capable of reacting to form a polyurethane and containing less than an equivalent amount of polyisocyanate, applying to the resulting coating a mixture comprising a polyester having terminal hydroxyl groups, a polyisocyanate, a tertiary amine catalyst and water, said mixture being capable of forming a polyurethane foam, and thereafter bring about chemical reaction to form a polyurethane foam from the last said mixture.

2. In a process of bonding a polyurethane foam to metal which comprises coating the metal with a non-foaming mixture containing a polyhydroxy compound and a polyisocyanate and capable of forming a polyurethane, placing a foamable mixture of polyhydroxy compound and polyisocyanate adjacent the resulting coating and effecting foaming thereof, the improvement which comprises including zinc chromate in said coating.

References Cited in the file of this patent

UNITED STATES PATENTS

| | | |
|---|---|---|
| 2,591,884 | Simon et al. | Apr. 8, 1952 |
| 2,602,783 | Simon et al. | July 8, 1952 |
| 2,636,257 | Ford | Apr. 28, 1953 |
| 2,639,252 | Simon et al. | May 19, 1953 |
| 2,650,185 | Larson et al. | Aug. 25, 1953 |
| 2,650,212 | Windemuth | Aug. 25, 1953 |
| 2,657,151 | Gensel et al. | Oct. 27, 1953 |
| 2,690,987 | Jeffries et al. | Oct. 5, 1954 |
| 2,740,743 | Pace | Apr. 3, 1956 |
| 2,753,276 | Brochhagen et al. | July 3, 1956 |
| 2,787,601 | Detrick et al. | Apr. 2, 1957 |